UNITED STATES PATENT OFFICE.

HORACE W. LASH, OF CLEVELAND, OHIO, ASSIGNOR TO THE WEST COAST IRON COMPANY, A CORPORATION OF OHIO.

METHOD OF MAKING CAST-IRON.

1,220,349.  Specification of Letters Patent.  Patented Mar. 27, 1917.

No Drawing.  Application filed November 21, 1912.  Serial No. 732,638.

*To all whom it may concern:*

Be it known that I, HORACE W. LASH, a citizen of the United States, residing at Cleveland, in the county of Cuyahoga and State of Ohio, have invented a certain new and useful Improvement in Methods of Making Cast-Iron, of which the following is a full, clear, and exact description.

This invention relates to a method for the production of pig or cast iron from steel scrap as a basis.

At the present time the universal method of producing pig iron is by the reduction of iron oxid in a blast furnace using as a charge, in addition to the iron oxid, coke and limestone.

In certain sections of the country, with more particular reference, perhaps, to the States along the Pacific coast, the natural occurrence of iron ore and of coal suitable for coking is very limited. Therefore, cast iron cannot be commercially made in these sections of the country, unless the necessary ore and coke be imported from other sections of the country. However, it will at once appear that such a thing is entirely impracticable because the expense involved would necessarily place the selling price of cast iron thus made, at a figure in excess of that for which pig iron may be obtained from the central or eastern portions of the country and transported to the Pacific coast.

These conditions bring it about that in California, for instance, the selling price per ton of pig iron is from $6.00 to $8.00 greater than the selling price of the same grade of this commodity at Pittsburgh.

There is, however, in these sections of the country, a large annual production of steel scrap material, by which I mean and include discarded steel, also mixtures of steel with wrought iron and with cast iron, in which mixtures the steel predominates,—this material occurring in the form of worn out and discarded rails, construction material, as beams and girders, and also sheets and borings.

This material has but small value in the States of the Pacific coast, for the market is limited, due to the absence of steel or iron producing mills in that section of the country, and further because of the high cost of transportation, it is impractical to ship this material to eastern markets.

In California there is a large supply of cheap fuel in the form of oil. Therefore, in view of this fact and the low market value of steel scrap, I have found that by my process herein disclosed, I can produce pig iron upon the Pacific coast to sell at a price substantially the same as the selling price of this same commodity at Pittsburgh.

I wish to repeat and emphasize the fact that the process herein disclosed relates to the making of pig or cast iron, by which I mean an iron product containing silicon, carbon, both graphitic and combined, as well as the impurities in the form of sulfur and phosphorus,—the silicon present running from 1% to 3% and the carbon present being greater than 2.50%.

This product is entirely distinguished from steel, in which the silicon is substantially eliminated, the carbon never being higher than 2.20% and more frequently lower, and further distinguished in that graphitic carbon is not found in steel, the carbon being all combined.

In carrying out the process of my invention, I use a reverberatory furnace which is, by preference, heated by utilizing oil or gas as a fuel.

Upon the hearth of the furnace there is placed the charge mixture, which consists of carbonaceous material, finely divided cast iron such as cast iron borings, silicious material, as sand, quartz, etc., and steel scrap. The proportions in which these materials are used is in the ratio of approximately 70% of scrap and 30% of the other three elements mentioned combined.

Preferably a mixture of the carbonaceous material, the finely divided cast iron and the silicious material is made by grinding equal parts of these three ingredients in a grinding pan or other mixing apparatus, wherein they can be thoroughly intermixed and commingled. With this material there may be mixed a small quantity of water, or preferably crude oil in quantity just sufficient to dampen the mixture in order to prevent the dust arising during the charge into the furnace.

In charging the mixture into the furnace, care should be taken to have sufficient quantity of carbon within the body of the furnace charge, that is to say beneath the surface against which the flame impinges, so that there will be sufficient carbon present to saturate the iron as the charge is melted.

As heat is applied and the mixture is melted, the metalloids present in the cast iron borings, such as silicon, sulfur, and phosphorus, together with the carbon, effect a reduction of any oxids present, particularly the $SiO_2$ to silicon, which is absorbed by the bath of molten iron along with portions of the carbon which is made a part of the charge mixture. Due to the intimate mixture of the materials in the first instance, the reduction of the $SiO_2$ and the absorption of the silicon and carbon by the molten metal takes place very rapidly until the bath becomes highly saturated with the silicon and the carbon.

A charge mixture of substantially the proportions indicated before should produce a finished product containing approximately 3% of total carbon and 2% of silicon, and also carrying with it the usual amount of phosphorus sulfur and manganese found in pig iron.

The purpose of treating the charge mixture in a reverberatory furnace is to produce a quiet melting which will be under as nearly non-oxidizing conditions as is possible to obtain in the melting of the charge. The flame impinging against the top of the charge will cause a slight oxidizing at this portion of the charge, but there will be no oxygen present within the body of the charge material, nor will there be any means for oxygen to penetrate within the body of the charge. Consequently below the surface of the charge mixture the conditions are highly reducing, which must be the condition within the furnace in carrying out my process.

When the furnace charge has been melted and brought to a proper condition of fluidity, it may be drawn off from the furnace and cast into pigs or such other forms as may be desirable.

Having described my invention, I claim:

1. The method of making casting iron which consists in melting in a reverberatory furnace a mixture of steel scrap, carbon, silicious material and finely divided cast iron.

2. The method of making cast iron which consists in melting under non-oxidizing conditions a mixture of steel scrap, carbon, silicious material and finely divided cast iron.

3. A method of making cast iron which consists in melting in a reverberatory furnace a mixture of steel scrap, carbonaceous material, silica and finely divided cast iron.

4. A method of making cast iron which consists in melting in a reverberatory furnace steel scrap together with a mixture in substantially equal parts of carbonaceous material, silicious material and finely divided cast iron.

5. A method of making cast iron which consists in melting under non-oxidizing conditions a mixture of steel scrap, carbonaceous material, silica and finely divided cast iron.

6. A method of making cast iron which consists in melting under non-oxidizing conditions steel scrap together with a mixture in substantially equal parts of carbonaceous material, silicious material and finely divided cast iron.

In testimony whereof, I hereunto affix my signature in the presence of two witnesses.

HORACE W. LASH.

Witnesses:
A. J. HUDSON,
N. C. HUBBARD.

Copies of this patent may be obtained for five cents each, by addressing the "Commissioner of Patents, Washington, D. C."